(12) United States Patent
Hong et al.

(10) Patent No.: US 10,277,449 B2
(45) Date of Patent: Apr. 30, 2019

(54) METHOD AND DEVICE FOR GENERATING NON-GAUSSIAN INTERFERENCE CHANNEL IN WIRELESS COMMUNICATION SYSTEM

(71) Applicant: Samsung Electronics Co., Ltd., Suwon-si, Gyeonggi-do (KR)

(72) Inventors: Sung-Nam Hong, Anyang-si (KR); Min Sagong, Suwon-si (KR); Chi-Woo Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/120,877

(22) PCT Filed: Feb. 27, 2015

(86) PCT No.: PCT/KR2015/001948
§ 371 (c)(1),
(2) Date: Aug. 23, 2016

(87) PCT Pub. No.: WO2015/130135
PCT Pub. Date: Sep. 3, 2015

(65) Prior Publication Data
US 2016/0366006 A1     Dec. 15, 2016

(30) Foreign Application Priority Data
Feb. 28, 2014     (KR) .................. 10-2014-0024426

(51) Int. Cl.
*H04L 27/00*     (2006.01)
*H03C 3/00*     (2006.01)
(Continued)

(52) U.S. Cl.
CPC ............ *H04L 27/362* (2013.01); *H04L 5/006* (2013.01); *H04L 5/0007* (2013.01);
(Continued)

(58) Field of Classification Search
USPC ........... 375/211, 219, 220, 222, 240, 240.26, 375/240.28, 257, 256, 254, 259, 260, 267,
(Continued)

(56) References Cited

U.S. PATENT DOCUMENTS

| 6,456,653 B1 * | 9/2002 | Sayeed | ............... H04L 27/2647 370/252 |
| 7,859,944 B2 * | 12/2010 | Zhou | ...................... H04B 11/00 367/134 |

(Continued)

FOREIGN PATENT DOCUMENTS

| CN | 1909537 A | 2/2007 |
| CN | 101175308 A | 5/2008 |

(Continued)

OTHER PUBLICATIONS

Hong et al.; FQAM : A Modulation Scheme for Beyond 4G Cellular Wireless Communication Systems; Globecom 2013 Workshop—Emerging Technologies for LTE-Advanced and Beyond-4G; IEEE; 2013.

(Continued)

*Primary Examiner* — Linda Wong
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). Provided is an operation method of a base station in a wireless communication system. The method comprises: receiving, from a terminal, at least one piece of information among channel quality information on a resource region allocated to the terminal and non-Gaussian information on a nulling region corresponding to the resource region; and determining a modulation order for the terminal, a code rate, a ratio of the resource region to the nulling region based on the
(Continued)

channel quality information and the non-Gaussian information.

18 Claims, 13 Drawing Sheets

(51) Int. Cl.
*H03K 7/06* (2006.01)
*H04L 27/36* (2006.01)
*H04L 5/00* (2006.01)
*H04L 27/20* (2006.01)
*H04L 27/10* (2006.01)

(52) U.S. Cl.
CPC ........ *H04L 5/0057* (2013.01); *H04L 27/0012* (2013.01); *H04L 27/206* (2013.01); *H04L 27/106* (2013.01)

(58) Field of Classification Search
USPC ....... 375/271, 275, 272, 295, 302, 304, 316, 375/338, 339, 340, 326, 354, 362, 347
See application file for complete search history.

(56) References Cited

U.S. PATENT DOCUMENTS

| | | | |
|---|---|---|---|
| 8,340,231 B1 | 12/2012 | Lee | |
| 9,197,385 B2* | 11/2015 | Khoshnevis | .......... H04L 5/0048 |
| 2005/0111492 A1* | 5/2005 | Kang | ...................... H04L 5/023 |
| | | | 370/480 |
| 2008/0102822 A1 | 5/2008 | Feng et al. | |
| 2010/0110874 A1* | 5/2010 | Kang | .................... H04L 5/0044 |
| | | | 370/208 |
| 2010/0260036 A1* | 10/2010 | Molnar | ................. H04L 5/0053 |
| | | | 370/203 |
| 2011/0044313 A1* | 2/2011 | Jeong | .................... H04L 5/0023 |
| | | | 370/344 |
| 2011/0142179 A1 | 6/2011 | Cheun et al. | |
| 2011/0200132 A1* | 8/2011 | Kim | ....................... H04B 7/024 |
| | | | 375/267 |
| 2012/0014242 A1* | 1/2012 | Kim | .................... H04B 7/0413 |
| | | | 370/203 |
| 2012/0027004 A1* | 2/2012 | Ko | ....................... H04B 7/0678 |
| | | | 370/344 |
| 2012/0045024 A1 | 2/2012 | Cui et al. | |
| 2012/0207242 A1* | 8/2012 | Maltsev | .............. H04L 27/2608 |
| | | | 375/295 |
| 2013/0107852 A1* | 5/2013 | Han | ....................... H04L 1/1861 |
| | | | 370/329 |
| 2013/0194961 A1* | 8/2013 | Kang | ................... H04B 7/0473 |
| | | | 370/252 |
| 2013/0223548 A1* | 8/2013 | Kang | ..................... H04B 7/024 |
| | | | 375/260 |
| 2013/0230013 A1 | 9/2013 | Seo et al. | |
| 2013/0272258 A1* | 10/2013 | Lee | ....................... H04B 7/0413 |
| | | | 370/329 |
| 2014/0016714 A1* | 1/2014 | Chen | ..................... H04B 7/024 |
| | | | 375/260 |
| 2014/0029687 A1* | 1/2014 | Kim | ...................... H04L 5/0007 |
| | | | 375/267 |
| 2015/0098518 A1* | 4/2015 | Kim | ....................... H04L 5/0007 |
| | | | 375/267 |
| 2015/0146559 A1* | 5/2015 | Yamada | ................ H04L 5/0023 |
| | | | 370/252 |
| 2015/0207550 A1* | 7/2015 | Lee | ....................... H04L 1/0041 |
| | | | 375/267 |
| 2015/0288493 A1* | 10/2015 | Pi | .......................... H04L 5/0007 |
| | | | 370/330 |
| 2015/0358111 A1* | 12/2015 | Marinier | ............... H04L 1/0003 |
| | | | 370/329 |
| 2015/0373682 A1* | 12/2015 | Bashar | .................. H04L 5/0005 |
| | | | 370/330 |
| 2016/0080051 A1* | 3/2016 | Sajadieh | .............. H04B 7/0456 |
| | | | 375/267 |
| 2016/0087829 A1* | 3/2016 | Jia | ........................ H04B 7/0452 |
| | | | 375/267 |
| 2016/0105836 A1* | 4/2016 | Seok | .................... H04W 72/042 |
| | | | 370/331 |
| 2016/0234859 A1* | 8/2016 | You | ...................... H04B 7/2656 |
| 2016/0308595 A1* | 10/2016 | Yamada | ............... H04B 7/0413 |
| 2017/0156131 A1* | 6/2017 | Kimura | .................... H04J 11/00 |
| 2017/0373738 A1* | 12/2017 | Chae | ...................... H04L 5/00 |

FOREIGN PATENT DOCUMENTS

| | | |
|---|---|---|
| CN | 103281267 A | 9/2013 |
| EP | 1 635 495 A1 | 3/2006 |
| KR | 10-2011-0068377 A | 6/2011 |
| WO | 2006/090209 A1 | 8/2006 |

OTHER PUBLICATIONS

European Search Report dated Sep. 1, 2017, issued in the European Application No. 15755611.9.
Chinese Office Action dated Mar. 5, 2019, issued in Chinese Application No. 201580010159.4.

* cited by examiner

SUBFRAME

| | SLOT 0 | SLOT 1 |
|---|---|---|
| QAM band | RB-1 | RB-1 |
| | RB-2 | RB-2 |
| | ⋮ | ⋮ |
| | RB-N | |
| Nulling QAM band | RB-(N+1) | RB-(N+1) |
| | ⋮ | ⋮ |
| | RB-M | RB-M |

FIG.2

METHOD AND DEVICE FOR GENERATING NON-GAUSSIAN INTERFERENCE CHANNEL IN WIRELESS COMMUNICATION SYSTEM

FIELD OF THE INVENTION

The present invention relates to a method and apparatus for forming a non-Gaussian interference channel in a wireless communication system.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Communication systems have assumed an interference signal as a Gaussian distribution to operate (adaptive modulation and encoding operation, soft-decision decoding metric generation, etc.) the system with low complexity. Owing to this, the communication systems have mainly used a Quadrature Amplitude Modulation (QAM)—series modulation scheme in order to make a characteristic of the interference signal maximally close to a Gaussian model. Also, the communication systems used a scheme of achieving target error performance by repeatedly transmitting QAM symbols to terminals that are not able to satisfy the target error performance even if applying a minimum channel code rate and a minimum modulation order.

However, in a recent wireless communication network, it was proved that a case where a statistical distribution of an additive noise follows a Gaussian distribution is the worst case in view of a channel capacity. Accordingly, it is obvious that, if a statistical distribution of interference signals having a characteristic of the additive noise follows a non-Gaussian distribution, it may get a higher network throughput than a conventional system.

A modulation scheme proposed for this reason is Frequency and Quadrature—Amplitude Modulation (FQAM). The FQAM is a hybrid modulation scheme in which QAM and Frequency-Shift Keying (FSK) are combined and only some of many subcarriers configuring a symbol are activated and therefore, a statistical distribution of an interference signal has a non-Gaussian characteristic.

This has similarities with a conventional FSK modulation scheme, but the FQAM transmits a QAM symbol to an activated subcarrier, thereby being capable of greatly improving a spectral efficiency than the FSK scheme.

If the FQAM is applied to users of a cell boundary where an interference signal is very strong, a non-Gaussian interference channel may be formed. Also, the FQAM repeatedly transmits the QAM symbol, thereby being capable of very greatly improving a network throughput compared to a system that forms a Gaussian interference channel. To apply the modulation scheme such as the FQAM and achieve performance improvement, it is essential to apply a non-binary encoding/decoding technology. However, the non-binary encoding/decoding technology has a problem in which complexity is very large.

DETAILED DESCRIPTION OF THE INVENTION

Technological Problem

An object of the present invention is to provide a modulation method and apparatus for generating a non-Gaussian interference channel in a wireless communication system.

Another object of the present invention is to provide a modulation method and apparatus for generating a non-Gaussian interference channel that is low in complexity and provides an excellent channel capacity in a wireless communication system.

A further object of the present invention is to provide a method and apparatus for forming a non-Gaussian interference channel and improving a network throughput in a wireless communication system.

A still another object of the present invention is to provide a method and apparatus for reducing the complexity of a non-binary encoding/decoding technology using a nulling scheme in a wireless communication system.

Means for Solving Problem

According to a first aspect of the present invention, in an operation method of a base station in a wireless communication system, the method is including receiving, from a terminal, at least one piece of information among channel quality information on a resource region allocated to the terminal and non-Gaussian information on a nulling region that corresponds to the resource region, and determining a modulation order for the terminal, a code rate and a ratio of the resource region to the nulling region based on the channel quality information and the non-Gaussian information.

According to a second aspect of the present invention, in an operation method of a terminal in a wireless communication system, the method is including determining channel quality information on an allocated resource region, measuring non-Gaussian information on a nulling region that corresponds to the resource region, and transmitting, to a base station, the channel quality information and the non-Gaussian information.

According to a third aspect of the present invention, in an apparatus of a base station in a wireless communication system, the apparatus is including a modem receiving, from a terminal, channel quality information on a resource region allocated to the terminal and non-Gaussian information on a nulling region that corresponds to the resource region, and a control unit determining a modulation order for the terminal, a code rate and a ratio of the resource region to the nulling region based on the channel quality information and the non-Gaussian information.

According to a fourth aspect of the present invention, in an apparatus of a terminal in a wireless communication system, the apparatus is including a control unit determining channel quality information on an allocated resource region and non-Gaussian information on a nulling region that corresponds to the resource region, and a modem transmitting, to a base station, the channel quality information and the non-Gaussian information.

Effects of the Invention

The present invention has an advantage of being capable of forming a non-Gaussian interference channel, and greatly improving performance compared to an existing Quadrature Amplitude Modulation (QAM) scheme using binary channel codes.

The present invention has an advantage of applying to a communication system that cannot apply Frequency and Quadrature—Amplitude Modulation (FQAM) due to the complexity of non-binary channel codes, thereby being capable of forming a non-Gaussian interference channel and due to this, being capable of improving performance.

BRIEF DESCRIPTION OF THE DRAWINGS

FIG. 2 is a second diagram illustrating an NQAM scheme according to an exemplary embodiment of the present invention.

BEST MODE FOR EMBODIMENT OF THE INVENTION

A preferred exemplary embodiment of the present invention is described below in detail with reference to the accompanying drawings. And, in describing the present invention, if it is determined that a concrete description of related known functions or constructions may unnecessarily obscure the gist of the present invention, a detailed description thereof is omitted. And, the terms described later, terms defined considering functions in the present invention, may be modified in accordance to terminal, operator's intention or practice, etc. Therefore, the definition should be given based on the content throughout the present specification.

Below, the present invention will describe a modulation method and apparatus for generating a non-Gaussian interference channel in a wireless communication system.

By non-Gaussianizing an interference channel, the present invention increases a network throughput. The present invention proposes a modulation method of forming a non-Gaussian interference channel, instead of a conventional technology (Quadrature Amplitude Modulation (QAM)+repetition) of forming a Gaussian interference channel. Particularly, the present invention increases a power of a QAM symbol and adds at least one unused subcarrier, instead of QAM+repetition. In this case, the present invention applies a pattern of inactivating a subcarrier such that it seems like randomly inactivating the subcarrier in a different user viewpoint.

And, a transmission power of an used resource increases according to a ratio of a resource inactivated. And, the present invention performs permutation of the unit of subcarrier within a Resource Block (RB) allocated every Orthogonal Frequency Division Multiple Access (OFDMA) symbol. In this case, the present invention applies a different permutation rule every each cell.

The present invention decreases complexity by applying of binary channel codes. A conventional Frequency-Quadrature Amplitude Modulation FQAM scheme forms a non-Gaussian interference channel but is not available for performance improvement compared to QAM+repetition until applying non-binary channel codes of the same order as a modulation order having a very large complexity compared to the binary channel codes.

However, the present invention is available for performance improvement even by applying of binary codes compared to QAM+repetition. That is, the present invention forms a non-Gaussian interference channel similarly with the FQAM scheme but may greatly decrease the complexity by applying the binary codes.

Figure 1:
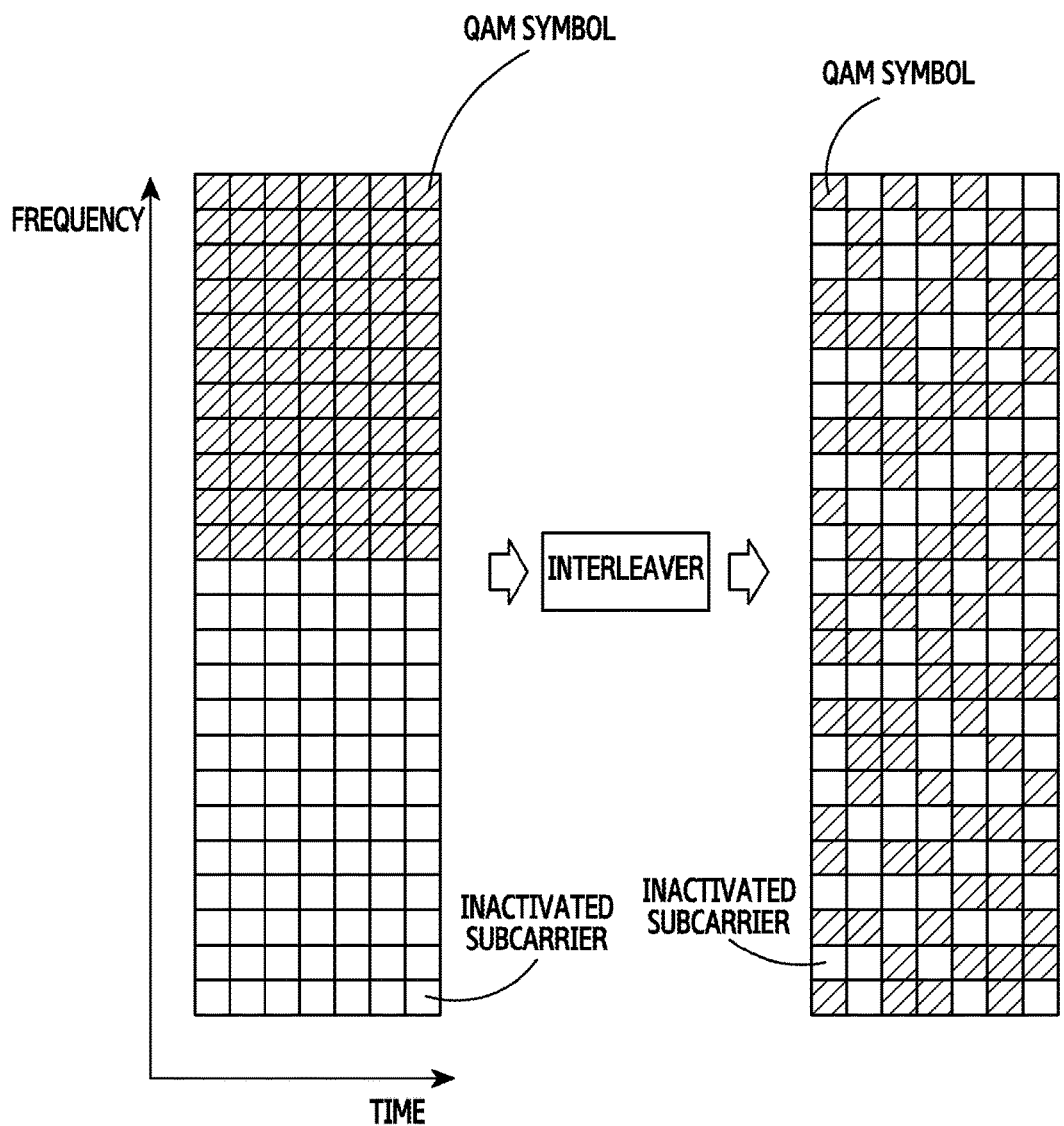
FIG. 1 is a first diagram illustrating a Nulling Quadrature Amplitude Modulation (NQAM) scheme according to an exemplary embodiment of the present invention.

FIG. 1 is a first diagram illustrating a Nulling QAM (NQAM) scheme according to an exemplary embodiment of the present invention.

Referring to the FIG. 1, the present invention proposes a modulation method of forming a non-Gaussian interference channel in place of a technology (QAM+repetition) of forming a Gaussian interference channel. Particularly, the present invention uses a scheme of increasing a power of a QAM symbol and inactivating at least one unused subcarrier, instead of QAM+repetition.

In this case, by performing an interleaving process, the present invention applies a pattern of inactivating a subcarrier such that it seems like randomly inactivating the subcarrier in a different user viewpoint. And, the present invention increases a transmission power of an used resource, suitable to a ratio of a resource inactivated.

And, the present invention performs permutation of the unit of subcarrier within a resource block allocated every OFDMA symbol. In this case, a different permutation rule is applied every each cell. A permutation rule every available cell is given as below.

First, the present invention may perform permutation of the unit of subcarrier within the allocated whole resource region. Or, the present invention may perform grouping by subcarriers of an integer number within the allocated whole resource region and perform permutation of the unit of corresponding group. Or, the present invention may perform permutation of the unit of subcarrier for each OFDMA symbol within the allocated whole resource region. In this case, the present invention may apply the same permutation rule every OFDMA symbol, or apply permutation rules different from one another every OFDMA symbol. Or, the present invention may perform grouping by subcarriers of an integer number for each OFDMA symbol within the allocated whole resource region and perform permutation of the unit of corresponding group. In this case, the present invention may apply the same permutation rule every OFDMA symbol, or apply permutation rules different from one another every OFDMA symbol.

FIG. 2 is a second diagram illustrating an NQAM scheme according to an exemplary embodiment of the present invention.

Referring to the FIG. 2, the present invention proposes a modulation method of forming a non-Gaussian interference channel in place of a technology (QAM+repetition) forming a Gaussian interference channel as mentioned above.

For this, the present invention separately operates a band using existing QAM and a band (or nulling subcarrier region) using NQAM in order to form the non-Gaussian interference channel using the NQAM.

The figure represents that, in a corresponding slot, bands of RB-(N+1) to RB-M are bands using NQAM, and bands of RB-1 to RB-N are bands using QAM.

Figure 3:
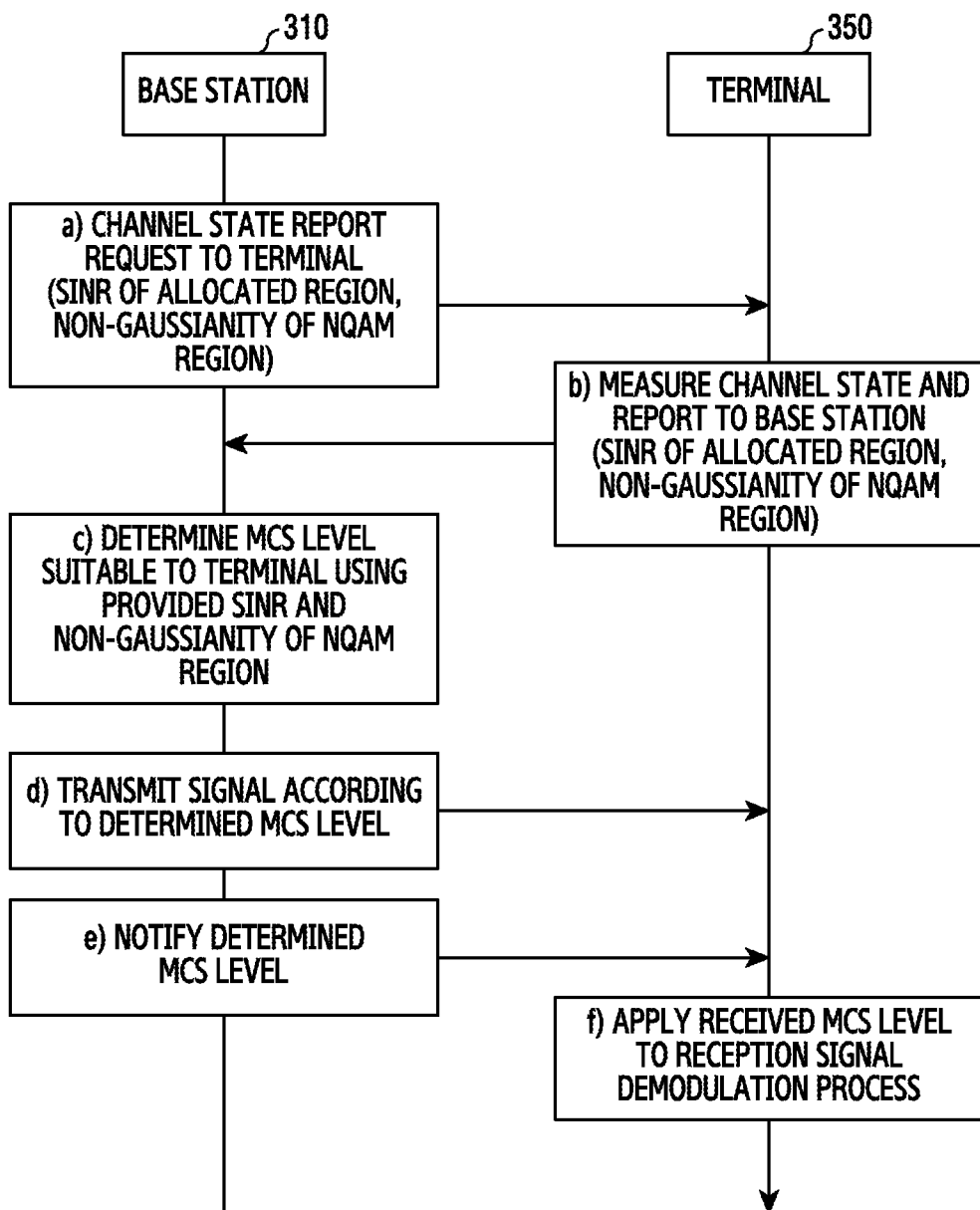
FIG. 3 is a diagram illustrating an operation scheme using NQAM according to an exemplary embodiment of the present invention.

FIG. 3 is a diagram illustrating an operation scheme using NQAM according to an exemplary embodiment of the present invention.

Referring to the FIG. 3, a base station 310 requests a channel state report to a terminal 350 (step a). In this case, a channel state that is requested to the terminal 350 to report includes a Signal-to-Interference-Plus-Noise Ratio (SINR) of a resource region that the terminal 350 is allocated, and/or the non-Gaussianity of an NQAM region.

Thereafter, the terminal 350 measures the channel state of the allocated resource region and reports the channel state to the base station 310 (step b). In this case, the channel state that the terminal 350 reports includes the SINR of the resource region that the terminal 350 is allocated, and/or the non-Gaussianity of the NQAM region (or nulling subcarrier region).

Thereafter, the base station 310 determines a modulation and coding scheme (MCS) level suitable to the terminal 350 using the SINR and the non-Gaussianity of the NQAM region which are provided from the terminal 350 (step c).

Thereafter, the base station 310 transmits, to the terminal 350, a signal according to the determined MCS level (step d). Thereafter, the base station 310 notifies the terminal 350 of the determined MCS level (step e). Here, the step d) and step e) may be carried out concurrently.

Thereafter, the terminal 350 applies the received MCS level to a reception signal demodulation process (step f).

Figure 4:
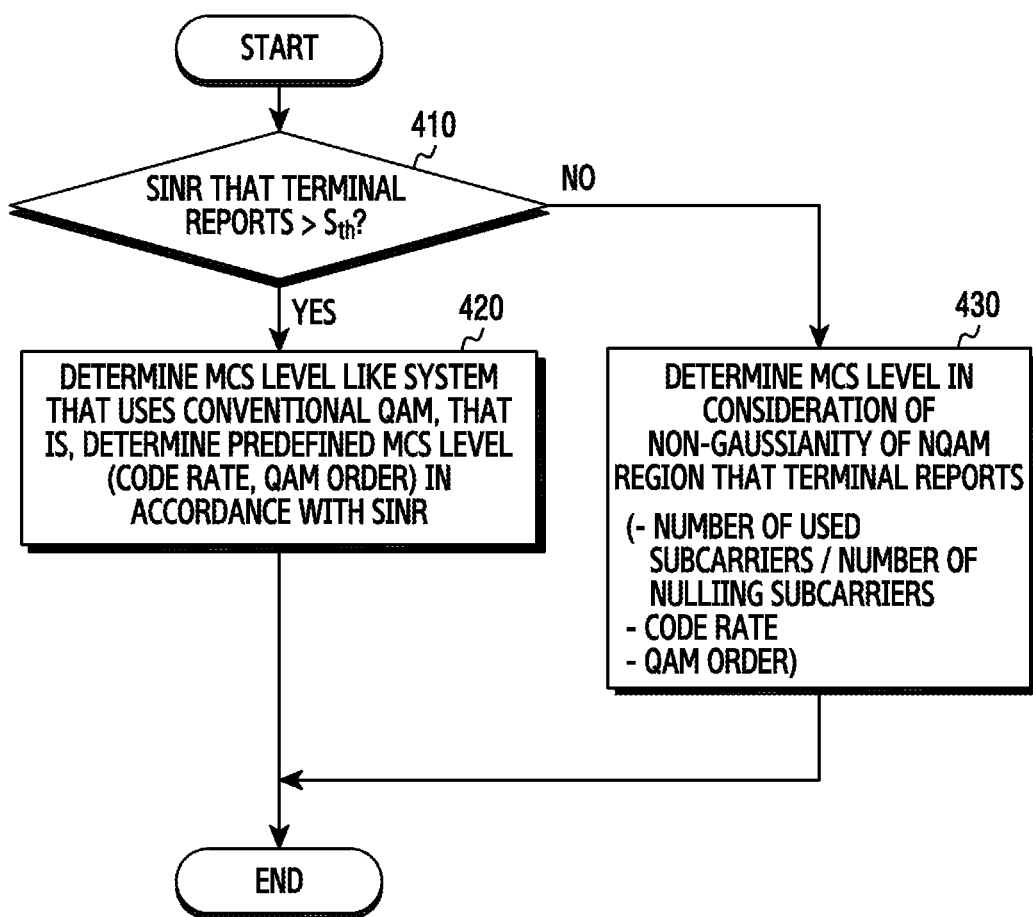
FIG. 4 is a flowchart illustrating a process for determining modulation and coding scheme (MCS) level in a base station according to an exemplary embodiment of the present invention.

FIG. 4 is a flowchart illustrating a process for determining MCS level in a base station according to an exemplary embodiment of the present invention.

Referring to the FIG. 4, if an SINR that is reported from a terminal is greater than $S_{th}$ (step 410), a base station determines an MCS level like a conventional system that uses QAM. That is, it determines a predefined MCS level (a code rate and/or a QAM modulation order) in accordance with the SINR as in the existing (step 420). Here, the $S_{th}$ is a threshold value determining whether to used NQAM or not.

If the SINR that the terminal reports is not greater than the $S_{th}$ (step 410), it determines an MCS level of the terminal, in consideration of the non-Gaussianity (α) of an NQAM region that is reported from the terminal (step 430). Here, the base station determines the number of allocation subcarriers/the number of nulling subcarriers, a code rate, and/or a modulation order of QAM.

A process of getting the α that is the non-Gaussianity in the present invention is given as follows.

Most of channel decoders receive a Log-Likelihood Ratio (LLR) as an input and estimate an information bit or symbol. Generally, a binary decoder determines the LLR as in <Equation 1> below.

$$L_{k,\lambda}^{BICM}(\hat{H}[k], y[k]) = \ln \frac{\sum_{w \in A_0^{\lambda}} f_{Y[k]}(y[k] \mid \hat{H}[k], s[k] = w)}{\sum_{w \in A_1^{\lambda}} f_{Y[k]}(y[k] \mid \hat{H}[k], s[k] = w)} \quad \text{Equation 1}$$

In the <Equation 1>, the $L_{k,\lambda}^{BICM}$ represents an LLR of a λth bit of a kth symbol corresponding to binary decoding, the $\hat{H}[k]$ represents the estimation of a channel coefficient for a kth transmission symbol, the y[k] represents a reception signal corresponding to the kth transmission symbol, the $A_0^{\lambda}$ represents a set of candidate symbols whose λth bits are equal to 0, the $A_1^{\lambda}$ represents a set of candidate symbols whose λth bits are equal to 1, the $f_{Y[k]}$ represents a PDF for a kth reception symbol, and the s[k] represents the kth transmission symbol. The w is a dummy variable representing a symbol candidate that is available for transmission. In a case of 16-QAM, the $A_0^{\lambda}$ includes 8 symbols among the whole 16 symbols, and the $A_1^{\lambda}$ includes the remnant 8 symbols.

As one may know through the <Equation 1>, determination of a Probability Density Function (PDF) is needed.

As a representative method among existing non-Gaussian decoding methods, there is a Complex Generalized Gaussian (CGG) decoding scheme. The CGG decoding scheme assumes that an interference signal or a noise follows a CGG distribution, and determines an LLR or PDF and provides the determination result as an input of a channel decoder. Because the CGG decoding scheme includes a Gaussian decoding scheme, the present invention explains only the CGG decoding scheme. A PDF of the CGG distribution is given as in <Equation 2> below.

$$f_z(z \mid \alpha, \beta) = \frac{\alpha}{2\pi\beta^2 \Gamma\left(\frac{2}{\alpha}\right)} \exp\left(-\left(\frac{|z|}{\beta}\right)^{\alpha}\right) \quad \text{Equation 2}$$

In the <Equation 2>, the $f_z$ is defined as a PDF of a noise, the Z is a variable representing a noise, the α is a shape parameter and is a variable expressing the non-Gaussianity, the β is a scale parameter and is a variable expressing a variance, and the Γ is a gamma function and is defined as $\Gamma(z) \triangleq \int_0^\infty t^{z-1} \exp(-t)dt$.

In the <Equation 2>, the PDF of the CGG distribution follows a Gaussian distribution if the α is equal to 2, and follows a super Gaussian distribution having a heavy-tail if the α is less than 2, and follows a sub Gaussian distribution having a light-tail if the α is greater than 2 That is, if the α is equal to 2, the CGG decoding scheme is identical with the Gaussian decoding scheme.

Most of interference signals and noises are modeled into super Gaussian or Gaussian in which the α belongs to a range of 0 to 2. The β called the scale parameter performs a role such as a variance of the Gaussian PDF. PDFs used for most of non-Gaussian decoding schemes include the shape parameter and scale parameter such as the α and β of the CGG distribution. Accordingly, the present invention explains the CGG as an example, but it is obvious that the present invention is identically applicable even to most of the existing non-Gaussian decoding schemes.

In order to CGG-decode QAM, determination of a PDF equation such as <Equation 3> below is required.

$$f_{Y[k]}(y[k] \mid \hat{H}[k], s[k]) = \frac{\alpha}{2\pi\beta^2 \Gamma(2/a)} \exp\left(-\left(\frac{|y[k] - \hat{H}[k]s[k]|}{\beta}\right)^\alpha\right) \quad \text{Equation 3}$$

In the <Equation 3>, the $f_{Y[k]}(\ )$ is defined as a PDF of a transmission symbol, the y[k] represents a reception signal corresponding to a kth transmission symbol, the Ĥ[k] represents a channel coefficient for the kth transmission symbol, the s[k] represents the kth transmission symbol, the α represents a shape parameter, the β represents a scale parameter, and the Γ is a gamma function and is defined as $\Gamma(z) \triangleq \int_0^\infty t^{z-1} \exp(-t)dt$.

A method of estimating the α value and the β value of the <Equation 3> exists variously. Below, the present invention explains a moment matching technique that is a previously proposed method, for example. According to the moment matching technique, the α value and the β value are estimated by matching a primary moment and a secondary moment. If expressing the estimation of the α value and the β value by an equation, it is given as in <Equation 4> below.

$$\alpha = \frac{\ln(3^6/2^{10})}{\ln\left(\left(E[|\hat{J}[k]|]\right)^2 / E[|\hat{J}[k]|^2] - \frac{\pi}{4} + \frac{9}{2^{3.5}}\right) + \ln\left(\frac{3}{2\sqrt{2}}\right)} \quad \text{Equation 4}$$

$$\hat{J}[k] = y[k] - \hat{H}[k]\hat{s}[k]$$

$$\beta = \frac{\Gamma(2/\alpha)}{\Gamma(3/\alpha)} E[|\hat{J}[k]|]$$

In the <Equation 4>, the α is defined as a shape parameter, the β represents a scale parameter, the y[k] represents a reception signal corresponding to a kth transmission symbol, the Ĥ[k] represents a channel coefficient for the kth transmission symbol, the ŝ[k] represents the kth transmission symbol estimated in a hard decision scheme, and the Γ is a gamma function and is defined as $\Gamma(z) \triangleq \int_0^\infty t^{z-1} \exp(-t)dt$.

Figure 5:
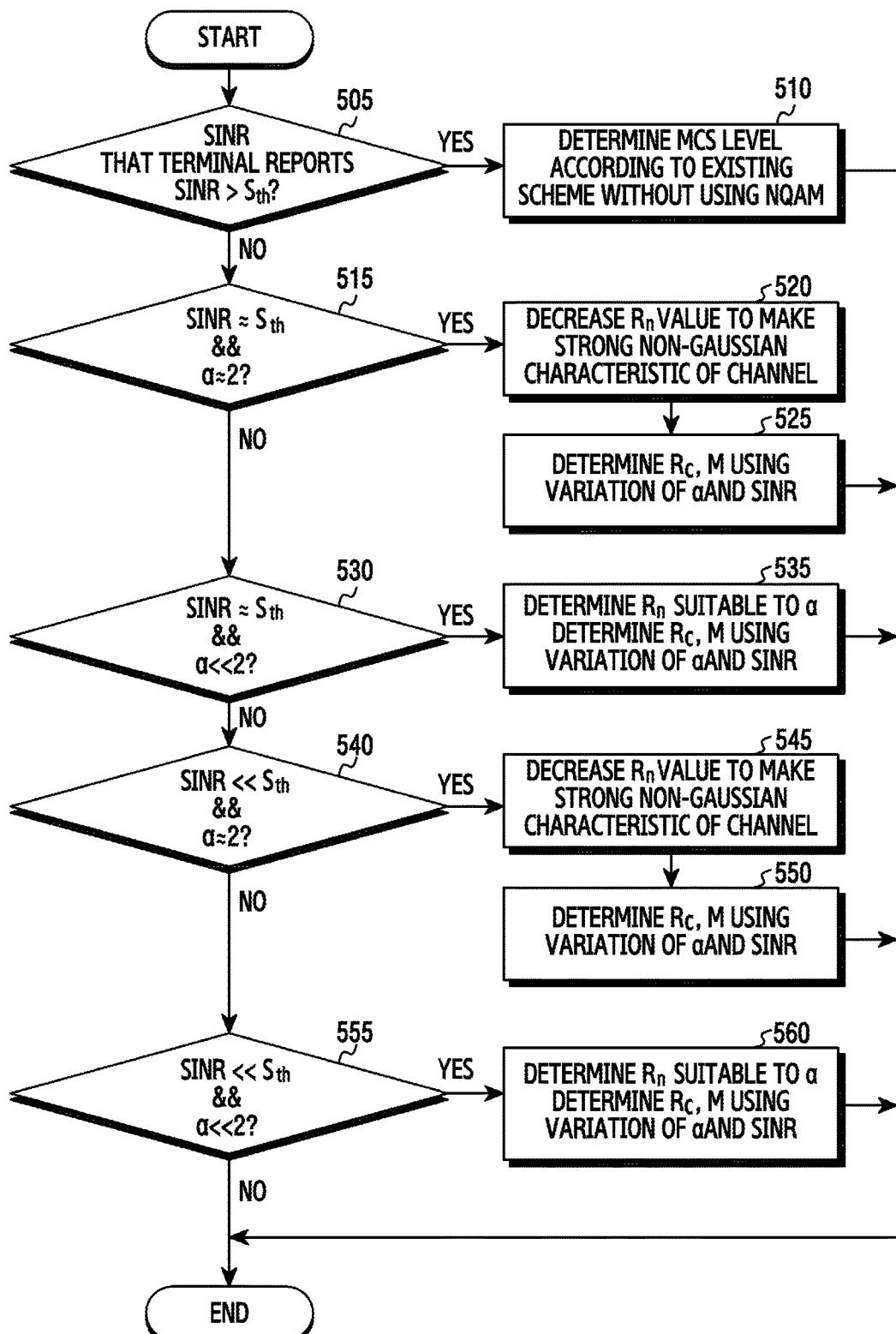
FIG. 5 is a flowchart illustrating a detailed process for determining MCS level in a base station according to an exemplary embodiment of the present invention.

FIG. 5 is a flowchart illustrating a detailed process for determining MCS level in a base station according to an exemplary embodiment of the present invention.

Referring to the FIG. 5, if an SINR that a terminal reports is greater than $S_{th}$ (step 505), a base station determines an MCS level according to an existing scheme, without using NQAM (step 510). Here, the $S_{th}$ is a threshold value determining whether to use NQAM or not.

If the SINR that the terminal reports is a value near the $S_{th}$, and α is a value close to 2 (step 515), that is, a channel has a strong Gaussian characteristic, the base station decreases $R_n$ to enhance a non-Gaussian characteristic of a wireless channel (step 520) and determines $R_c$ and M using a variation of the α according to $R_n$ and the SINR value and determines an MCS level according to $R_c$ and M (step 525). Here, the $R_n$, is a ratio of an allocation subcarrier to a nulling subcarrier. That is, the $R_n$=allocation subcarrier/nulling subcarrier. And, the non-Gaussian characteristic is shown strong as the nulling subcarrier increases or the $R_n$, decreases.

The $R_c$ is a code rate of a wireless channel, and the M represents a QAM modulation order. The base station may determine the $R_c$, M, and $R_n$, and determine the MCS level according to $R_c$, M, and $R_n$.

If the SINR that the terminal reports is a value near the $S_{th}$, and the α is much less than 2 (step 530), that is, a channel has a strong non-Gaussian characteristic (step 530), the base station determines $R_n$, suitable to the non-Gaussian characteristic α of a current wireless channel and determines $R_c$ and M using the α and SINR value and determines an MCS level according to $R_c$ and M (step 535).

If the SINR that the terminal reports is a value much less than the $S_{th}$, and the α is a value close to 2 (step 540), that is, a channel has a strong Gaussian characteristic, the base station sets $R_n$, to have a very small value to enchance the non-Gaussian characteristic of a wireless channel (step 545), and determines $R_c$, M using a variation of the α according to $R_n$ and the SINR value and sets an MCS level according to $R_c$ and M (step 550).

If the SINR that the terminal reports is a value much less than the $S_{th}$, and the α is a value much less than 2 (step 555), that is, a channel has a strong non-Gaussian characteristic, the base station determines $R_n$ suitable to the non-Gaussian characteristic α of a current wireless channel and determines $R_c$ and M using the α and the SINR value and determines an MCS level according to $R_c$ and M (step 560).

In the FIG. 5, it may be appreciated that the $R_c$, M, $R_n$ decrease as the α of an NQAM band increases, that is, as the non-Gaussian characteristic of a wireless channel decreases, and the $R_c$, M, $R_n$ increase as the α of the NQAM band decreases, that is, as the non-Gaussian characteristic of the wireless channel increases.

Figure 6:
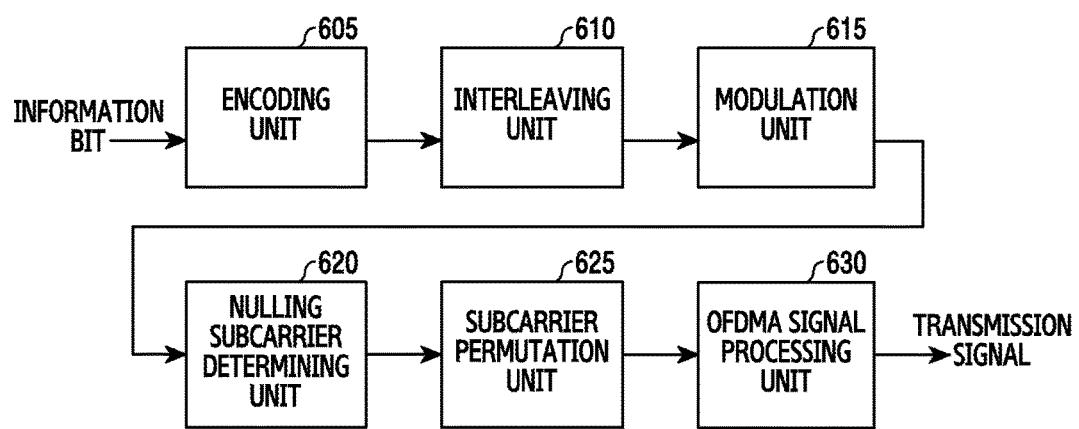
FIG. 6 is a block diagram illustrating a transmission device according to an exemplary embodiment of the present invention.

FIG. 6 is a block diagram illustrating a transmission device according to an exemplary embodiment of the present invention.

Referring to the FIG. 6, it illustrates a block construction of the transmission device, and an information bit is inputted to and binary channel encoding is performed in an encoding unit 605. The binary channel encoded information bit is interleaved in an interleaving unit 610, and the interleaved information bit is modulated in a modulation unit 615. The modulation unit 615 can, for example, use QAM as a modulation scheme.

Thereafter, a modulated QAM symbol is inputted to a nulling subcarrier determining unit 620, and the nulling subcarrier determining unit 620 determines and sets a nulling subcarrier when determining a subcarrier to map in the modulated QAM symbol. That is, the nulling subcarrier determining unit 620 determines and sets and maps the nulling subcarrier in the modulated QAM symbol in accordance with $R_n$ that is a ratio of an allocation subcarrier to a nulling subcarrier. The outputted subcarrier is inputted to a subcarrier permutation unit 625.

Thereafter, the subcarrier permutation unit 625 performs permutation by the unit of subcarrier and outputs the permutation result. The output of the subcarrier permutation unit 625 is inputted to an OFDMA signal processing unit 630. The OFDMA signal processing unit 630 constructs OFDMA symbols through Inverse Fast Fourier Transform (IFFT) operation and Cyclic Prefix (CP) insertion. The present invention describes based on an OFDMA system, but is possible to expand to an Orthogonal Frequency Division Multiplexing (OFDM) system as well.

Figure 7:
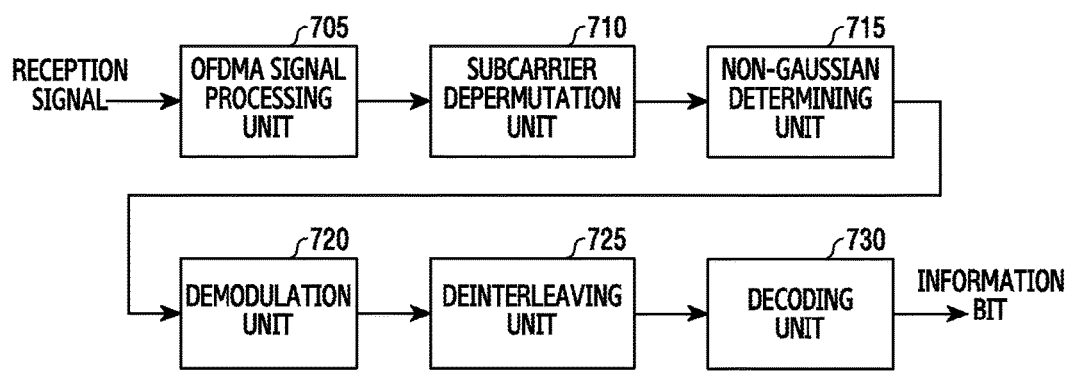
FIG. 7 is a block diagram illustrating a reception device according to an exemplary embodiment of the present invention.

FIG. 7 is a block diagram illustrating a receiver according to an exemplary embodiment of the present invention.

Referring to the FIG. 7, it illustrates a block construction of the receiver, and a reception signal is inputted to and processed in an OFDMA signal processing unit 705. The OFDMA signal processing unit 705 divides the reception signal by the unit of OFDMA symbol, and restores signals mapped to subcarriers through Fast Fourier Transform (FFT) operation and outputs.

Thereafter, a subcarrier depermutation unit 710 performs depermutation of the unit of subcarrier for an output signal of the OFDMA signal processing unit 705.

Thereafter, non-Gaussianity is determined in a non-Gaussian determining unit 715. That is, the non-Gaussianity determining unit 715 determines the non-Gaussianity ($\alpha$) of a wireless channel that uses a nulling subcarrier. Also, the non-Gaussian determining unit 715 provides an output signal of the OFDMA signal processing unit 705 to a demodulation unit 720.

Thereafter, the demodulation unit 720 demodulates a provided signal in accordance with an MCS level presented by a base station.

Thereafter, the deinterleaving unit 725 deinterleaves the demodulated signal, and the decoding unit 730 decodes the deinterleaved signal in accordance with a code rate ($R_c$) presented by the base station and outputs a demodulation bit. The present invention describes based on an OFDMA system, but is possible to expand to an OFDM system as well.

Figure 8:
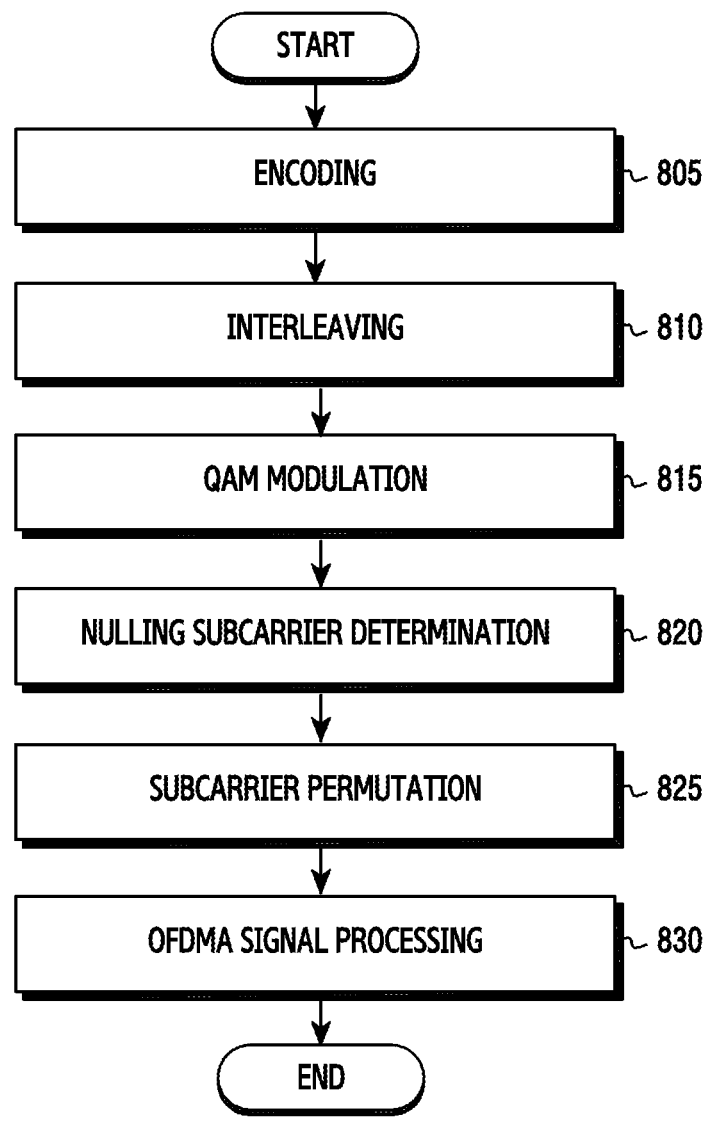
FIG. 8 is a flowchart illustrating an operation process of a transmission device according to an exemplary embodiment of the present invention.

FIG. 8 is a flowchart illustrating an operation process of a transmission device according to an exemplary embodiment of the present invention.

Referring to the FIG. 8, an information bit is inputted to and binary channel encoding is performed in the encoding unit 605 (step 805). The binary channel encoded information bit is interleaved in the interleaving unit 610 (step 810), and the interleaved information bit is modulated in the modulation unit 615 (step 815). Here, the modulation unit 615 may use QAM as a modulation scheme. Thereafter, a modulated QAM symbol is inputted to the subcarrier determining unit 620, and the subcarrier determining unit 620 determines and sets a nulling subcarrier when determining a subcarrier to map in the modulated QAM symbol (step 820). That is, the subcarrier determining unit 620 determines and sets and maps the nulling subcarrier in the modulated QAM symbol in accordance with $R_n$ that is a ratio of an allocation subcarrier to a nulling subcarrier. The outputted subcarrier is inputted to the subcarrier permutation unit 625.

Thereafter, the subcarrier permutation unit 625 performs permutation by the unit of subcarrier and outputs the permutation result (step 825). The output of the subcarrier permutation unit 625 is inputted to the OFDMA signal processing unit 630. The OFDMA signal processing unit 630 constructs OFDMA symbols through Inverse Fast Fourier Transform (IFFT) operation and Cyclic Prefix (CP) insertion (step 830). The present invention describes based on an OFDMA system, but is possible to expand to an OFDM system as well.

Figure 9:
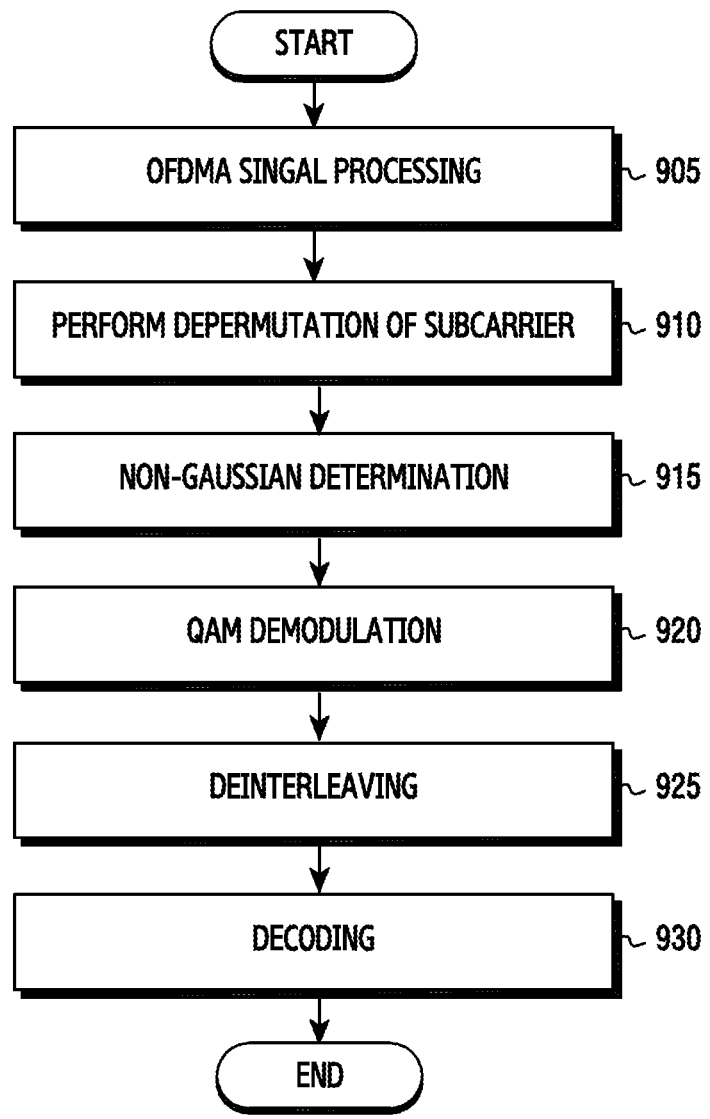
FIG. 9 is a flowchart illustrating an operation process of a reception device according to an exemplary embodiment of the present invention.

FIG. 9 is a flowchart illustrating an operation process of a reception device according to an exemplary embodiment of the present invention.

Referring to the FIG. 9, a reception signal is inputted to and processed in the OFDMA signal processing unit 705 (step 905). The OFDMA signal processing unit 705 divides the reception signal by the unit of OFDMA symbol, and restores signals mapped to subcarriers through Fast Fourier Transform (FFT) operation and outputs the signals.

Thereafter, the subcarrier depermutation unit 710 performs depermutation of the unit of subcarrier for an output signal of the OFDMA signal processing unit 705 (step 910).

Thereafter, non-Gaussianity is determined in the non-Gaussian determining unit 715 (step 915). That is, the non-Gaussianity determining unit 715 determines the non-Gaussianity ($\alpha$) of a wireless channel that uses a nulling subcarrier. Also, the non-Gaussian determining unit 715 provides an output signal of the OFDMA signal processing unit 705 to the demodulation unit 720. The non-Gaussianity ($\alpha$) may be reported to a base station.

Thereafter, the demodulation unit 720 demodulates a provided signal in accordance with an MCS level presented by the base station (step 920). For one example, QAM demodulation may be used.

Thereafter, the deinterleaving unit 725 deinterleaves the demodulated signal (step 925), and the decoding unit 730 decodes the deinterleaved signal in accordance with a code rate ($R_c$) presented by the base station and outputs a demodulation bit (step 930).

The present invention describes based on an OFDMA system, but is possible to expand to an OFDM system as well.

Figure 10:
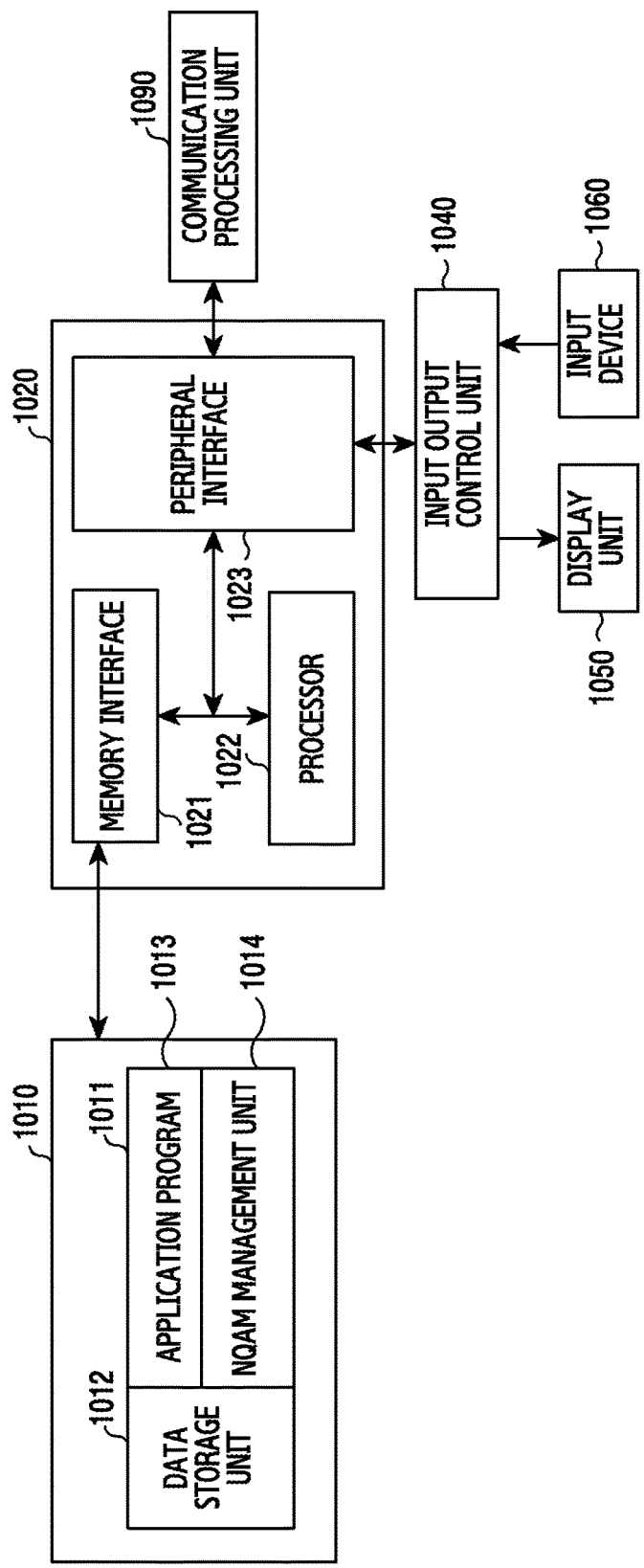
FIG. 10 is a block diagram illustrating a construction of an electronic device according to an exemplary embodiment of the present invention.

FIG. 10 is a block diagram illustrating a construction of an electronic device according to an exemplary embodiment of the present invention.

Referring to the FIG. 10, the electronic device corresponds to a base station or a terminal in the present invention. The electronic device includes a memory 1010, a processor unit 1020, an input output control unit 1040, a display unit 1050 and an input device 1060. Here, the memory 1010 may exist in plural. If describing each constituent element, it is given as follows.

The memory 1010 includes a program storage unit 1011 storing a program for controlling an operation of the electronic device and a data storage unit 1012 storing data generated during program execution.

The data storage unit 1012 may store data required for operations of an application program 1013, and an NQAM management unit 1014.

The program storage unit 1011 includes the application program 1013, and the NQAM management unit 1014. Here, the program included in the program storage unit 1011, a set of instructions, may be expressed as an instruction set as well.

The application program 1013 includes an application program that operates in the electronic device. That is, the application program 1013 includes an instruction of an application that is driven by the processor 1022.

The electronic device includes a communication processing unit 1090 performing a communication function for voice communication and data communication, and the communication processing unit 1090 may include the transmission unit and the receiver of FIGS. 6 and 7 aforementioned.

The NQAM management unit 1014 controls an operation of the communication processing unit 1090 such that the base station of the present invention performs the following operations. That is, the NQAM management unit 1014 controls to instruct to control the operation of the communication processing unit 1090 and perform operations as follows.

The NQAM management unit 1014 controls such that an information bit is inputted to and binary channel encoding is performed in the encoding unit 605.

The NQAM management unit 1014 controls such that the binary channel encoded information bit is interleaved in the interleaving unit 610.

The NQAM management unit 1014 controls such that the interleaved information bit is modulated in the modulation unit 615. Here, the NQAM management unit 1014 may use QAM as a modulation scheme.

The NQAM management unit 1014 controls such that the subcarrier determining unit 620 determines and sets a nulling subcarrier when determining a subcarrier to map in a modulated QAM symbol. That is, the NQAM management unit 1014 controls to determine and set and map the nulling subcarrier in the modulated QAM symbol in accordance with $R_n$ that is a ratio of an allocation subcarrier to a nulling subcarrier.

The NQAM management unit 1014 controls such that the subcarrier permutation unit 625 performs permutation by the unit of subcarrier and outputs the permutation result.

The NQAM management unit 1014 controls the OFDMA signal processing unit 630 to construct OFDMA symbols through Inverse Fast Fourier Transform (IFFT) operation and Cyclic Prefix (CP) insertion.

The NQAM management unit 1014 controls an operation of the communication processing unit 1090 to perform the following operations in a terminal of the present invention.

That is, the NQAM management unit 1014 instructs to control an operation of the communication processing unit 1090 and perform operations as follows.

The NQAM management unit 1014 controls such that a reception signal is inputted to and processed in the OFDMA signal processing unit 705. That is, the NQAM management unit 1014 controls the OFDMA signal processing unit 705 to divide the reception signal by the unit of OFDMA symbol, and restore signals mapped to subcarriers through Fast Fourier Transform (FFT) operation and output the signals.

The NQAM management unit 1014 controls the subcarrier depermutation unit 710 to perform depermutation of the unit of subcarrier for an output signal of the OFDMA signal processing unit 705.

The NQAM management unit 1014 controls the non-Gaussian determining unit 715 to determine non-Gaussianity. That is, the NQAM management unit 1014 controls the non-Gaussianity determining unit 715 to determine the non-Gaussianity ($\alpha$) of a wireless channel that uses a nulling subcarrier.

The NQAM management unit 1014 controls the demodulation unit 720 to demodulate a provided signal in accordance with an MCS level presented by a base station. For one example, QAM demodulation may be used.

The NQAM management unit 1014 controls the deinterleaving unit 725 to deinterleave the demodulated signal.

The NQAM management unit 1014 controls the decoding unit 730 to decode the deinterleaved signal in accordance with a code rate ($R_c$) presented by a base station and output a demodulation bit.

The present invention describes based on an OFDMA system, but is possible to expand to an OFDM system as well.

The memory interface 1021 controls access to the memory 1010 by a constituent element such as the processor 1022 or the peripheral interface 1023.

The peripheral interface 1023 controls the connection of the processor 1022 and the memory interface 1021 with an input output peripheral device of the base station.

The processor 1022 controls the base station to provide a corresponding service using at least one software program. At this time, the processor 1022 executes at least one program stored in the memory 1010 and provides a service corresponding to the corresponding program.

The input output control unit 1040 provides an interface between an input output device such as the display unit 1050 and the input device 1060, etc. and the peripheral interface 1023.

The display unit 1050 displays state information, an inputted character, a moving picture and a still picture, etc. For example, the display unit 1050 displays application program information that is driven by the processor 1022.

The input device 1060 provides input data generated by selection of the electronic device to the processor unit 1020 through the input output control unit 1040. At this time, the input device 1060 includes a key pad including at least one hardware button and a touch pad sensing touch information, etc. For example, the input device 1060 provides touch information of a touch sensed through the touch pad, a touch and drag, a touch and release, etc. to the processor 1022 through the input output control unit 1040.

In various exemplary embodiments, an apparatus of a terminal in a wireless communication system may include a control unit determining channel quality information on an allocated resource region and non-Gaussian information on a nulling region corresponding to the resource region, and a modem transmitting the channel quality information and the non-Gaussian information to a base station.

In various exemplary embodiments, the modem may receive a signal for a modulation order and code rate on which the non-Gaussian information is reflected, and receive information on the allocated region.

In various exemplary embodiments, the modem may receive information on the allocated region.

Figure 11:
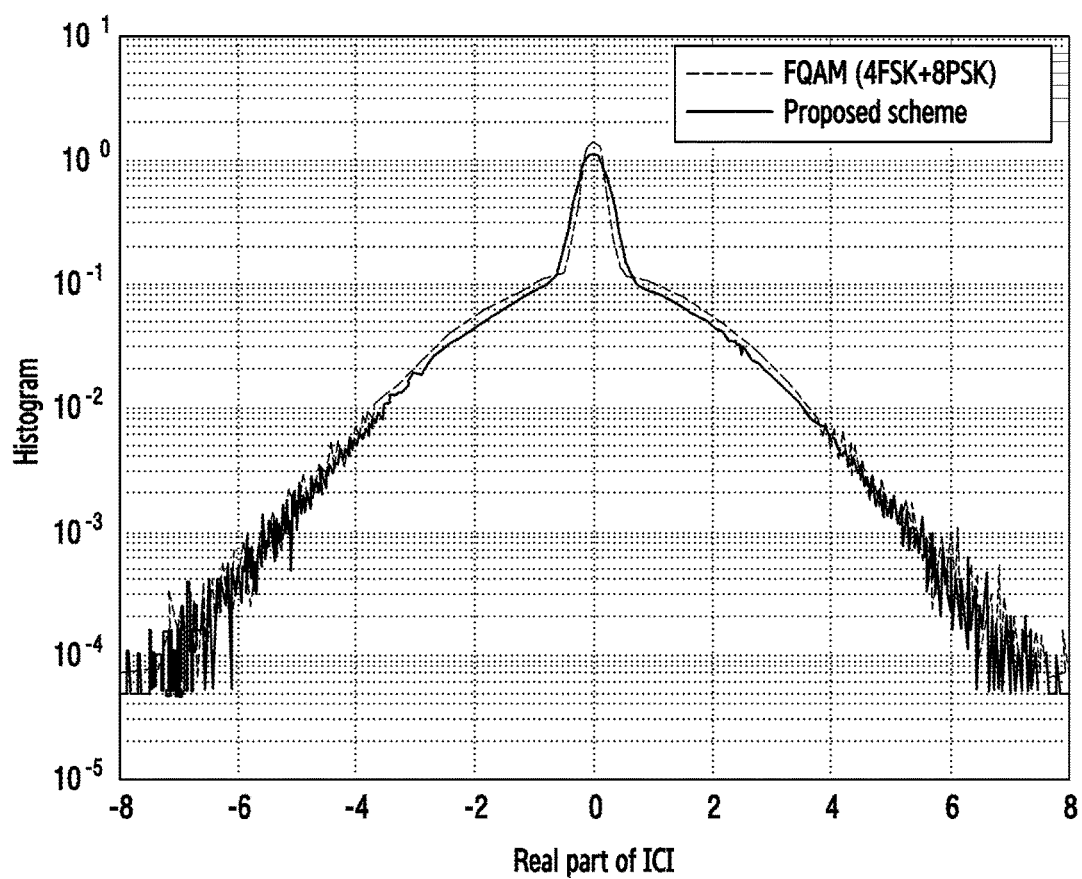
FIG. 11 is a diagram illustrating an interference channel distribution according to an exemplary embodiment of the present invention.

FIG. 11 is a diagram illustrating an interference channel distribution according to an exemplary embodiment of the present invention.

Referring to the FIG. 11, FQAM is an environment in which one subcarrier is activated every four subcarriers. Even a scheme of the present invention sets to make vacant three subcarriers per one data subcarrier. It may be checked that NQAM of the present invention may form a non-Gaussian interference channel similar with that of the FQAM.

Figure 12:
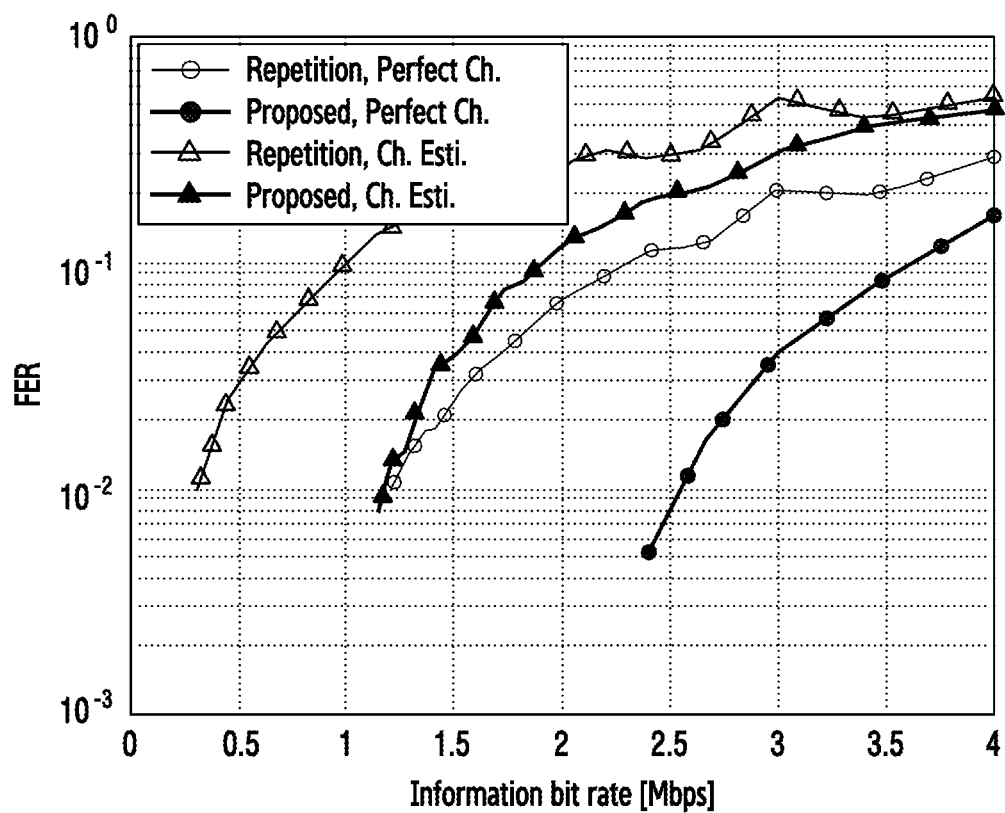
FIG. 12 is a first diagram illustrating performance according to an exemplary embodiment of the present invention.

FIG. 12 is a first diagram illustrating performance according to an exemplary embodiment of the present invention.

Referring to the FIG. 12, in a 3-cell structure, it may be appreciated that, at applying of a scheme of the present invention, a network throughput is double increased compared to the existing QAM+repetition.

It may be appreciated that the scheme of the present invention provides a great performance improvement effect compared to the existing scheme in a situation in which a channel estimation error takes place. This is because a pilot damage is decreased by a subcarrier made vacant in the present invention.

Figure 13:
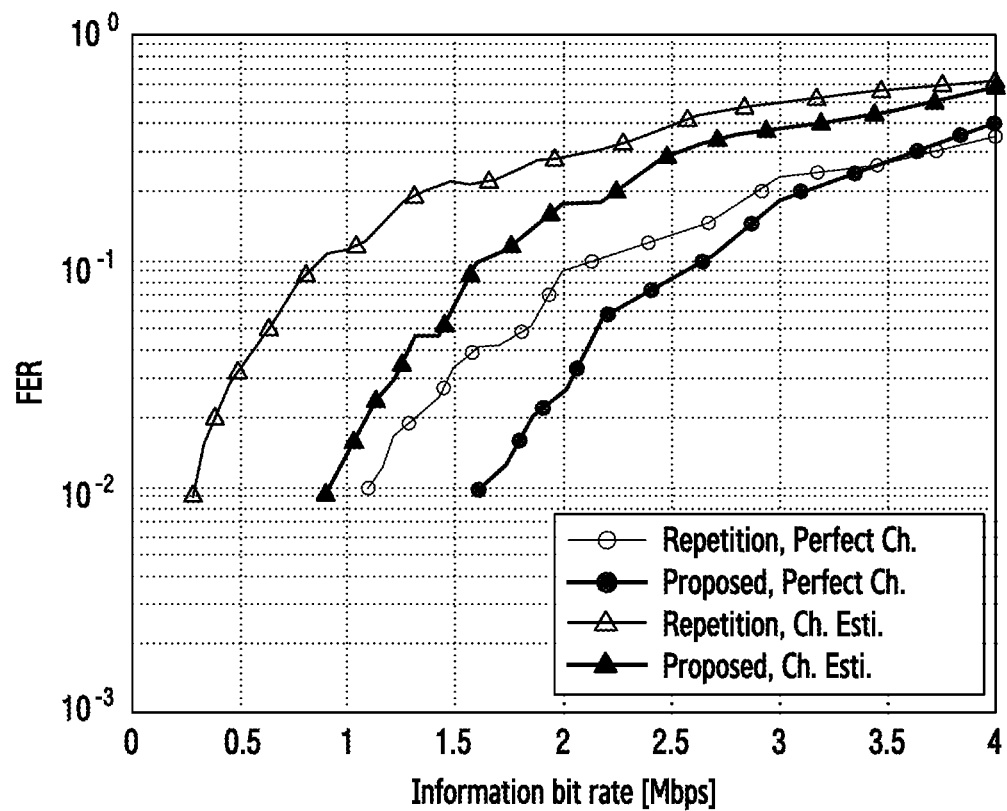
FIG. 13 is a second diagram illustrating performance according to an exemplary embodiment of the present invention.

FIG. 13 is a second diagram illustrating performance according to an exemplary embodiment of the present invention.

Referring to the FIG. 13, in a 7-cell structure, it may be appreciated that, at applying of a scheme of the present invention, a network throughput is increased by one and a half times compared to the existing QAM+repetition. It may be appreciated that, if an interference cell is is increased, a performance improvement effect is decreased, but the performance of the proposed method is still superior to that of the existing scheme.

While a concrete exemplary embodiment has been described in a detailed description of the present invention, it is undoubted that various modifications are possible without departing from the scope of the present invention. Therefore, the scope of the present invention should not be limited and defined by the described exemplary embodiment and should be defined by not only the scope of claims described later but also equivalents to this scope of the claims.

What is claimed is:

1. A method for operating a transmission device in a wireless communication system, the method comprising:
    mapping modulation symbols into subcarriers according to a ratio of a number of allocated subcarriers to be used for a transmission to a number of nulling subcarriers to be unused for a transmission;
    performing a permutation by a unit of at least one subcarrier for the modulation symbols mapped to the subcarriers; and
    transmitting, to a reception device, the modulation symbols through subcarriers allocated based on a result of the permutation,
    wherein the ratio of the number of the allocated subcarriers to the number of the nulling subcarriers is determined based on a channel quality on a region of the allocated subcarriers and a non-Gaussianity on a region of the nulling subcarriers.

2. The method of claim 1, further comprising:
    encoding data by using a binary channel code; and
    modulating the encoded data to generate the modulation symbols.

3. The method of claim 1, further comprising:
    receiving, from the reception device, information regarding a channel between the transmission device and the reception device, the information regarding the channel including at least one of information regarding the channel quality on the region of the allocated subcarriers and information regarding the non-Gaussianity on the region of the nulling subcarriers; and
    determining the ratio of the number of the allocated subcarriers to the number of the nulling subcarriers based on the channel quality and the non-Gaussianity.

4. The method of claim 1, further comprising:
    determining a code rate and a modulation order for the modulation symbols based on at least one of the channel quality and the non-Gaussianity.

5. The method of claim 4, wherein one of the code rate and the modulation order decreases as the non-Gaussianity decreases.

6. The method of claim 1, wherein the ratio of the number of the allocated subcarriers to the number of the nulling subcarriers decreases as the non-Gaussianity decreases.

7. The method of claim 1, wherein the permutation is performed according to a cell-specific permutation rule.

8. The method of claim 1, wherein the unit of at least one subcarrier comprises a unit of subcarrier, or a unit of group of subcarriers.

9. The method of claim 1, wherein the permutation is performed according to different permutation rules for each time resource.

10. A transmission device in a wireless communication system, the transmission device comprising:
    one or more processors configured to:
        map modulation symbols into subcarriers according to a ratio of a number of allocated subcarriers to be used for a transmission to a number of nulling subcarriers to be unused for a transmission, and
        perform a permutation by a unit of at least one subcarrier for the modulation symbols mapped to the subcarriers; and
    a transceiver configured to transmit, to a reception device, the modulation symbols through subcarriers allocated based on a result of the permutation,
    wherein the ratio of the number of the allocated subcarriers to the number of the nulling subcarriers is determined based on a channel quality on a region of the allocated subcarriers and a non-Gaussianity on a region of the nulling subcarriers.

11. The transmission device of claim 10, wherein the one or more processors is further configured to encode data by using a binary channel code, and modulate the encoded data to generate the modulation symbols.

12. The transmission device of claim 10, wherein the one or more processors is further configured to determine a code rate and a modulation order for the modulation symbols based on at least one of the channel quality and the non-Gaussianity.

13. The transmission device of claim 12, wherein one of the code rate and the modulation order decreases as the non-Gaussianity decreases.

14. The transmission device of claim 10,
    wherein the transceiver is further configured to receive, from the reception device, information regarding a channel between the transmission device and the reception device, the information regarding the channel including at least one of information regarding the channel quality on the region of the allocated subcarriers and information regarding the non-Gaussianity on the region of the nulling subcarriers; and
    wherein the one or more processors is further configured to determine the ratio of the number of the allocated subcarriers to the number of the nulling subcarriers based on the channel quality and the non-Gaussianity.

15. The transmission device of claim 10, wherein the ratio of the number of the allocated subcarriers to the number of the nulling subcarriers decreases as the non-Gaussianity decreases.

16. The transmission device of claim 10, wherein the permutation is performed according to a cell-specific permutation rule.

17. The transmission device of claim 10, wherein the unit of at least one subcarrier comprises a unit of subcarrier, or a unit of group of subcarriers.

18. The transmission device of claim 10, wherein the permutation is performed according to different permutation rules for each time resource.

* * * * *